(12) United States Patent
Bhagavathy et al.

(10) Patent No.: US 9,118,912 B2
(45) Date of Patent: Aug. 25, 2015

(54) OBJECT-AWARE VIDEO ENCODING STRATEGIES

(75) Inventors: Sitaram Bhagavathy, Plainsboro, NJ (US); Joan Llach, Cesson Sevigne (FR); Dong-Qing Zhang, Plainsboro, NJ (US); Jesus Barcons-Palau, Burbank, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 541 days.

(21) Appl. No.: 13/508,562

(22) PCT Filed: Dec. 8, 2010

(86) PCT No.: PCT/US2010/003110
§ 371 (c)(1),
(2), (4) Date: May 8, 2012

(87) PCT Pub. No.: WO2011/081639
PCT Pub. Date: Jul. 7, 2011

(65) Prior Publication Data
US 2012/0224629 A1    Sep. 6, 2012

Related U.S. Application Data

(60) Provisional application No. 61/284,151, filed on Dec. 14, 2009.

(51) Int. Cl.
*H04N 7/26* (2006.01)
*H04N 19/103* (2014.01)
(Continued)

(52) U.S. Cl.
CPC .......... *H04N 19/103* (2014.11); *H04N 19/115* (2014.11); *H04N 19/124* (2014.11);
(Continued)

(58) Field of Classification Search
CPC . H04N 19/176; H04N 19/147; H04N 19/154; H04N 19/167; H04N 19/177; H04N 19/137; H04N 19/103; H04N 19/85; H04N 19/124; H04N 19/115; H04N 19/14; H04N 19/172; H04N 19/20; H04N 17/46
USPC .......................... 375/240.09, 240.03, 240.08
See application file for complete search history.

(56) References Cited

U.S. PATENT DOCUMENTS 5,214,507 A    5/1993    Aravind et al.
5,561,719 A    10/1996   Sugahara et al.
(Continued)

FOREIGN PATENT DOCUMENTS

CN    101494785 A    7/2009
EP    1227684 A2     7/2002
(Continued)

OTHER PUBLICATIONS

Sun et al. "A Robust and Adaptive Rate Control Algorithm for Object-Based Video Coding". IEEE Transactions on Circuits and Systems for Video Technology, vol. 14, No. 10. Oct. 2004, pp. 1167-1182.*
(Continued)

*Primary Examiner* — Christopher S Kelley
*Assistant Examiner* — Zhihan Zhou
(74) *Attorney, Agent, or Firm* — Robert D. Shedd; Richard LaPeruta (57) ABSTRACT

A method of object-aware video coding is provided that comprises the steps of: receiving a video sequence having a plurality of frames; selecting at least two frames; determing total area of at least one object of interest in each of the at least two frames; comparing the total area to a threshold area; classifying each of the at least two frames as being a low object weighted frame or a high object weighted frame, low object weighted frames being frames having the total area exceeding the threshold area and high object weighted frames being frame having the total area not exceeding the threshold area; and encoding each low object weighted frame according to one encoding mode and encoding each high object weighted frame according to a different encoding mode.

15 Claims, 4 Drawing Sheets

(51) Int. Cl.

| | |
|---|---|
| *H04N 19/172* | (2014.01) |
| *H04N 19/115* | (2014.01) |
| *H04N 19/14* | (2014.01) |
| *H04N 19/154* | (2014.01) |
| *H04N 19/20* | (2014.01) |
| *H04N 19/176* | (2014.01) |
| *H04N 19/147* | (2014.01) |
| *H04N 19/46* | (2014.01) |
| *H04N 19/124* | (2014.01) |
| *H04N 19/137* | (2014.01) |
| *H04N 19/167* | (2014.01) |
| *H04N 19/85* | (2014.01) |
| *H04N 19/177* | (2014.01) |

(52) U.S. Cl.
CPC ............ *H04N19/137* (2014.11); *H04N 19/14* (2014.11); *H04N 19/147* (2014.11); *H04N 19/154* (2014.11); *H04N 19/167* (2014.11); *H04N 19/172* (2014.11); *H04N 19/176* (2014.11); *H04N 19/20* (2014.11); *H04N 19/46* (2014.11); *H04N 19/85* (2014.11); *H04N 19/177* (2014.11)

(56) References Cited

U.S. PATENT DOCUMENTS

| | | | |
|---|---|---|---|
| 6,064,436 | A | 5/2000 | Okada |
| 6,192,075 | B1 | 2/2001 | Jeng et al. |
| 6,782,135 | B1* | 8/2004 | Viscito et al. ............... 382/239 |
| 8,149,909 | B1* | 4/2012 | Garbacea et al. ......... 375/240.03 |
| 2005/0025249 | A1* | 2/2005 | Zhao et al. ............... 375/240.24 |
| 2006/0109902 | A1* | 5/2006 | Yu et al. .................. 375/240.12 |
| 2008/0056365 | A1* | 3/2008 | Igarashi .................. 375/240.13 |
| 2009/0086814 | A1* | 4/2009 | Leontaris et al. ......... 375/240.02 |
| 2009/0202164 | A1* | 8/2009 | Rossato et al. ................ 382/238 |
| 2010/0124274 | A1* | 5/2010 | Cheok et al. ............ 375/240.03 |
| 2011/0235654 | A1* | 9/2011 | Jones et al. .................. 370/465 |

FOREIGN PATENT DOCUMENTS

| | | |
|---|---|---|
| GB | 2371434 | 7/2000 |
| JP | 5227524 A | 9/1993 |
| JP | 8181992 | 7/1996 |
| JP | 5137132 A | 6/2006 |
| WO | WO 2009/126258 | 10/2009 |
| WO | WO2009126261 A2 | 10/2009 |
| WO | WO 2010060463 A1 * | 6/2010 |

OTHER PUBLICATIONS

Yin et al. "A Perceptual Two-Pass VBR MPEG-2 Video Encoder". IEEE Transactions on Consumer Electronics, vol. 51, No. 4. Nov. 2005, pp. 1237-1247.*

Sun et al: "A Robust and Adaptive Rate Control Algorithm for Object-Based Video Coding", IEEE Transactions on Circuits & Systems for Video Technology, vol. 14, No. 10, Oct. 2004, pp. 1167-1182, IEEE USA.

Yin et al: "A Perceptual Two-Pass VBR MPEG-2 Video Encoder", IEEE Transactions on Consumer Electronics, vol. 51, No. 4, Nov. 2005, pp. 1237-1247, IEEE USA.

Nyamwemo etal: "Error Resilient Video Coding via Weighted Distortion", Proceedings 2009 IEEE International Conference on Multimedia Expo (ICME), Jun. 28-Jul. 3, 2009.

Shen et al: "A Fast Downsizing Video Transcoder for H.264/AVC with Rate-Distortion Optimal Mode Decision", International Conference on Multimedia Expo (ICME), 2006.

Search Report Jul. 18, 2011.

* cited by examiner

OBJECT-AWARE VIDEO ENCODING STRATEGIES

CROSS-REFERENCE TO RELATED APPLICATIONS

This application is a National Stage Application and claims the benefit, under 35 U.S.C. §365 of International Application PCT/US2010/003110 filed Dec. 8, 2010 which was published in accordance with PCT Article 21(2) on Jul. 7, 2011 in English, and which claims the benefit of U.S. Provisional Patent Application No. 61/284,151 filed on Dec. 14, 2009.

FIELD OF THE INVENTION

The present invention relates to object-aware video coding.

BACKGROUND OF THE INVENTION

In many video coding applications, videos have to be encoded with constraints on the bit-rate, e.g. 50-400 kbps is typical for delivery to mobile devices. Encoding a video with low bit-rates leads to a loss of visual information and thereby impacts its subjective quality or viewing experience. Under such lossy encoding conditions, subjective quality can be improved by reducing the loss of quality in salient or important regions.

Figure 1:
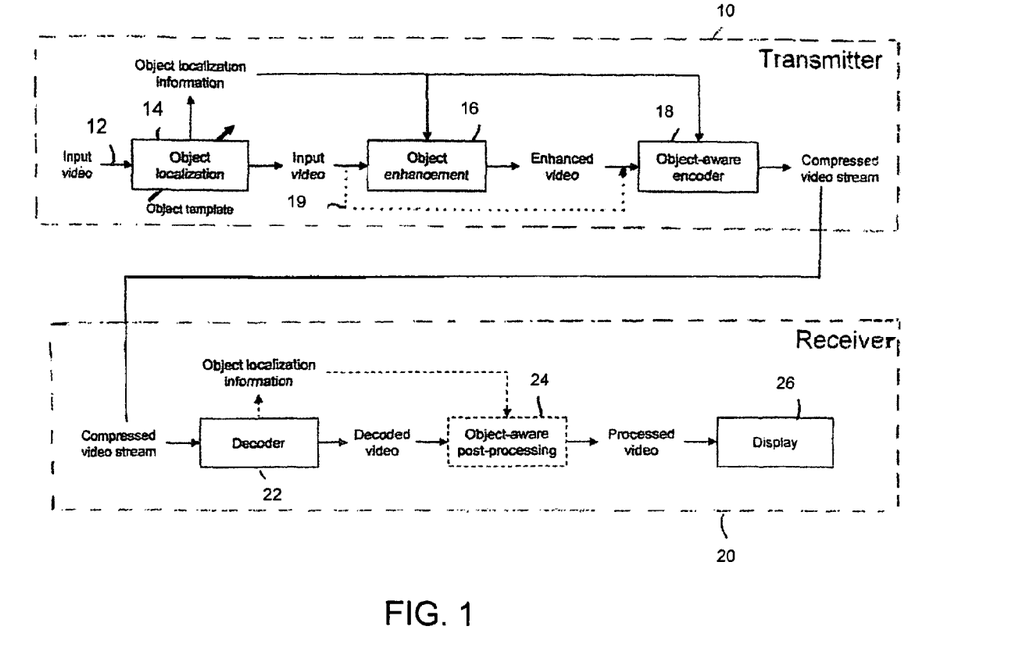
FIG. 1 is a block diagram of a system for enhancing the visibility of an object in a digital video constructed used in the present invention.

In certain systems, such as the object highlighting system shown in FIG. 1, objects or regions of interest are detected and their coded quality is improved by pre-processing and/or using an object-aware encoder to better preserve important objects. This done because it is important to viewers be able to clearly see objects of interest in a video such as the ball or players in soccer videos.

A typical object-aware encoder is capable of receiving information about various objects or regions in a video and using this information in order to better preserve important objects and thus improve the viewing experience of the user. Such an encoder usually works by using the object information to guide encoding operations such as resource allocation and mode decisions.

There are a plurality of methods which can preserve objects; however, for a given video, the selection of one method may not yield optimum object preservation for the entire video. As such, a need exists for an object preservation methodology which is reflexible enough to preserve an entire video optimally.

SUMMARY OF THE INVENTION

A method of object-aware video coding is provided that comprises the steps of: receiving a video sequence having a plurality of frames; selecting at least two frames; determining total area of at least one object of interest in each of the at least two frames; comparing the total area to a threshold area; classifying each of the at least two frames as being a low object weighted frame or a high object weighted frame, low object weighted frames being frames having the total area exceeding the threshold area and high object weighted frames being frame having the total area not exceeding the threshold area; and encoding each low object weighted frame according to one encoding mode and encoding each high object weighted frame according to a different encoding mode. The method can further include determining which macroblocks in a frame contain the at least one object of interest; determining an initial QP for each of the at least two frames; applying an offset to the initial QP for the low object weighted frames; and increasing bit allocation for to the macroblocks contained in the at least one object of interest responsive to the applying step. Additional steps can include determining (106) per-frame QP offset contribution from an amount of temporal masking effect at a frame ($\Delta QP_{Masking}$) for those high object weighted frames that are contiguous; combining (110) the $\Delta QP_{Masking}$ with a QP offset contribution obtained from the frame type ($\Delta QP_{Type}$); encoding (114) the high object weighted frames that are contiguous using a bit rate obtained using the combined calculated $\Delta QP_{Masking}$ with a QP offset contribution obtained from the frame type ($\Delta QP_{Type}$); calculating (102) frame complexity for the high object weighted frames that are contiguous; selecting (104) frame type based on GOP boundary and GOP coding pattern for each GOP of high object weighted frames that are contiguous; and calculating (106) the per frame QP-offset contribution based on frame type ($\Delta QP_{Type}$), wherein the calculating (106) per-frame QP offset contribution from an amount of temporal masking effect at a frame ($\Delta QP_{Masking}$) is performed using $\Delta QP_{Masking}(n) = a \cdot Compl_{Masking}(n)$, where $Compl_{Masking}(n)$ comprises a temporal masking complexity of a frame calculated as an average of a current frame's neighboring frames in a predetermined size of window for high object weighted frames. The method can further include the steps of: calculating (108) an average $\Delta QP_{Masking}$ over all high object weighted frames; normalizing (110) $\Delta QP_{Masking}$; calculating (110) a final per frame $\Delta QP$; calculating (112) an allocated bit budget and rate control using the calculated final per frame $\Delta QP$. The step of calculating (102) frame complexity for each frame for high object weighted frames can be performed using forward inter-frame prediction.

An additional embodiment of the object-aware video coding method comprises the steps of: receiving a video sequence having a plurality of frames; selecting at least two frames; determining total area of at least one object of interest in Bach of the at least two frames; comparing the total area to a threshold area; classifying each of the at least two frames as being a low object weighted frame or a high object weighted frame; encoding each low object weighted frame according to one encoding mode and encoding each high object weighted frame according to a different encoding mode; determining (106) per-frame QP offset contribution from an amount of temporal masking effect at a frame ($\Delta QP_{Masking}$) for those high object weighted frames that are contiguous; combining (110) the $\Delta QP_{Masking}$ with a QP offset contribution obtained from the frame type ($\Delta QP_{Type}$); encoding (114) the high object weighted frames that are contiguous using a bit rate obtained using the combined calculated $\Delta QP_{Masking}$ with a QP offset contribution obtained from the frame type ($\Delta QP_{Type}$); determining which macroblocks in a frame contain the at least one object of interest; determining an initial QP for each of the at least two frames; and applying an offset to the initial QP for the low object weighted frames, whereby bit allocation for the macroblocks contained in the at least one object of interest increases.

Additional embodiments of the method can comprise the steps of: receiving a video sequence having a plurality of frames; selecting at least two frames; determining total area of at least one object of interest in each of the at least two frames; comparing the total area to a threshold area; classifying each of the at least two frames as being a low object weighted frame or a high object weighted frame; encoding each low object weighted frame according to one encoding mode and encoding each high object weighted frame according to a different encoding mode; determining sum of absolute differences (SAD) between original and encoded macroblocks pixels for more than one coding mode for the low object weighted frames; selecting a coding mode having lower sum of absolute difference than at least one other coding mode in the sum of absolute differences determining step for the low object weighted frames; and coding the low object weighted frames according the respective coding modes selected in the selecting step. Here, these embodiments can include applying an encoder weight array in the sum of absolute differences determining step such that pixels of the objects are assigned a greater weight than non-object pixels.

Additional embodiments of the invention include an encoder for encoding video sequences, wherein the encoder is adapted to include a means for determining area of objects of interest in video frames; a means for setting a mode selection threshold area; a means for comparing the area of objects to the threshold area a plurality of the frames; a means for selecting encoding mode responsive to the comparing means, wherein the selectring means is adapted to select different encoding modes for different frames; and means for encoding, wherein the encoding means is adapted to encode the different frames with the different encoding modes. The determining means can determine the number of pixels that constitute the objects of interest. The selecting means can employ a perceptual quantization parameter offset determination for frames having the area of the number of the pixels exceeding the threshold area with the encoding means coding the frames in a coding mode that is responsive to the perceptual quantization parameter offset determination. The selecting means can alternatively employ a naïve QP offset determination, wherein the selecting means is adapted to determine an initial QP for each of at least two frames having the area of the number of the pixels not exceeding the threshold, to apply an offset to the initial QP for the at least two frames; and increasing bit allocation for macroblocks contained in the at least one object of interest responsive to the offset with the encoding means coding the least two frames having the area of the number of the pixels not exceeding the threshold frames in a coding mode that is responsive to the offset. The selecting means can also employ a naïve OP offset determination, wherein the selecting means is adapted to determine an initial QP for each of at least two frames having the area of the number of the pixels not exceeding the threshold, to apply an offset to the initial QP for the at least two frames; and increasing bit allocation for macroblocks contained in the at least one object of interest responsive to the offset with the encoding means coding the least two frames having the area of the number of the pixels not exceeding the threshold frames in a coding mode that is responsive to the offset.

BRIEF DESCRIPTION OF THE DRAWINGS

The invention will now be described by way of example with reference to the accompanying figures of which.

DETAILED DESCRIPTION OF THE EMBODIMENTS

The present invention is directed to improving object preservation through a hybrid methodology involving quantization parameter (QP) offset, a weighted distortion metric, and perceptual quantization (QP) offset.

The invention is applicable to various types of object-aware encoders and can involve decreasing the QP or quantization step size for macroblocks constituting important objects or regions and can further involve decreasing the QP or quantization step size for macroblocks constituting unimportant objects or regions.

In an embodiment of the invention, a method preserves important objects in a video. Based on some criteria, the encoder can use, for example, QP offsets, a weighted distortion measure, and perceptual QP offsets (or a combination thereof) for relevant macroblocks (MBs). A novel weighted distortion measure is introduced which allows object information to influence encoding mode decisions.

FIG. 1 shows the object highlighting system applicable to embodiments of the invention. In particular, an object enhancing system, constructed in accordance with the present invention, may span all the components in a transmitter 10, or the object enhancement component may be in a receiver 20. There are three stages in the process chain where object highlighting may be performed: (1) pre-processing where the object is enhanced in transmitter 10 prior to the encoding (i.e., compression) stage; (2) encoding where the region of interest that contains the object is given special treatment in transmitter 10 by the refinement of information about the object and its location; and (3) post-processing where the object is enhanced in receiver 20 after decoding utilizing side-information about the object and its location transmitted from transmitter 10 through the bitstream as metadata. An object enhancing system, constructed in accordance with the present invention, can be arranged to provide object highlighting in only one of the stages identified above, or in two of the stages identified above, or in all three stages identified above.

The FIG. 1 system for enhancing the visibility of an object in a digital picture includes means for providing an input video containing an object of interest. The source of the digital picture that contains the object, the visibility of which is to be enhanced, can be a television camera of conventional construction and operation and is represented by an arrow 12.

The FIG. 1 system also includes means for storing information representative of the nature and characteristics of the object of interest (e.g., an object template) and developing, in response to the video input and the information representative of the nature and characteristics of the object, object localization information that identifies and locates the object. Such means, identified in FIG. 1 as an object localization module 14, include means for scanning the input video, on a frame-by-frame basis, to identify the object (i.e., what is the object) and locate that object (i.e., where is the object) in the picture having the nature and characteristics similar to the stored information representative of the nature and characteristics of the object of interest. Object localization module 14 can be a unit of conventional construction and operation that scans the digital picture of the input video on a frame-by-frame basis and compares sectors of the digital picture of the input video that are scanned with the stored information representative of the nature and characteristics of the object of interest to identify and locate, by grid coordinates of the digital picture, the object of interest when the information developed from the scan of a particular sector is similar to the stored information representative of the nature and characteristics of the object.

In general, object localization module 14 implements one or more of the following methods in identifying and locating an object of interest:

Object tracking—The goal of an object tracker is to locate a moving object in a video. Typically, a tracker estimates the object parameters (e.g. location, size) in the current frame, given the history of the moving object from the previous frames. Tracking approaches may be based on, for example, template matching, optical flow, Kalman filters, mean shift analysis, hidden Markov models, and particle filters.

Object detection—The goal in object detection is to detect the presence and location of an object in images or video frames based on prior knowledge about the object. Object detection methods generally employ a combination of top-down and bottom-up approaches. In the top-down approach, object detection methods are based on rules derived from human knowledge of the objects being detected. In the bottom-up approach, object detection methods associate objects with low-level structural features or patterns and then locate objects by searching for these features or patterns.

Object segmentation—In this approach, an image or video is decomposed into its constituent "objects," which may include semantic entities or visual structures, such as color patches. This decomposition is commonly based on the motion, color, and texture attributes of the objects. Object segmentation has several applications, including compact video coding, automatic and semi-automatic content-based description, film post-production, and scene interpretation. In particular, segmentation simplifies the object localization problem by providing an object-based description of a scene.

Figure 2:
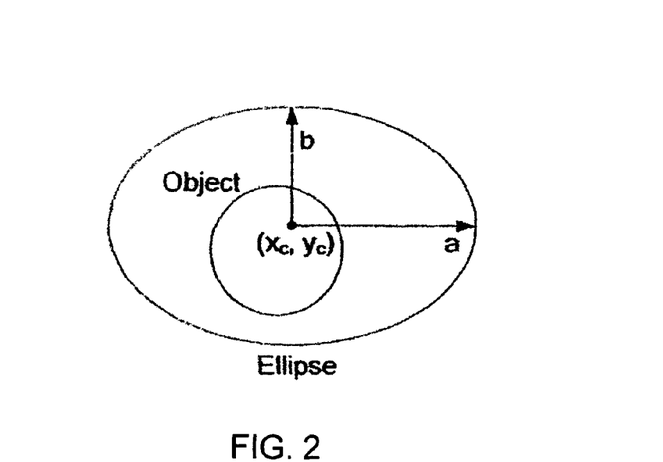
FIG. 2 illustrates approximate object localization provided by the FIG. 1 system.

FIG. 2 illustrates approximate object localization provided by object localization module 14. A user draws, for example, an ellipse around the region in which the object is located to approximately locate the object. Eventually, the approximate object localization information (i.e., the center point, major axis, and minor axis parameters of the ellipse) can be refined.

Ideally, object localization module 14 operates in a fully automated mode. In practice, however, some manual assistance might be required to correct errors made by the system, or, at the very least, to define important objects for the system to localize. Enhancing non-object areas can cause the viewer to be distracted and miss the real action. To avoid or minimize this problem, a user can draw, as described above, an ellipse around the object and the system then can track the object from the specified location. If an object is successfully located in a frame, object localization module 14 outputs the corresponding ellipse parameters (i.e., center point, major axis, and minor axis). Ideally, the contour of this bounding ellipse would coincide with that of the object.

When, however, the parameters might be only approximate and the resulting ellipse does not tightly contain the object and object enhancement is applied, two problems might occur. First, the object might not be wholly enhanced because the ellipse does not include the entire object. Second, non-object areas might be enhanced. Because both these results can be undesirable, it is useful, under such circumstances, to refine the object region before enhancement. Refinement of object localization information is considered in greater detail below.

The system in FIG. 1 further includes means responsive to the video input and the object localization information that is received from object localization module 14 for developing an enhanced video of that portion of the digital picture that contains the object of interest and the region in which the object is located. Such means, identified in FIG. 1 as an object enhancement module 16, can be a unit of conventional construction and operation that enhances the visibility of the region of the digital picture that contains the object of interest by applying conventional image processing operations to this region. The object localization information that is received, on a frame-by-frame basis, from object localization module 14 includes the grid coordinates of a region of predetermined size in which the object of interest is located. In addition, as indicated above, object enhancement helps in reducing degradation of the object during the encoding stage which follows the enhancement stage and is described below. The operation of the FIG. 1 system up to this point corresponds to the pre-processing mode of operation referred to above.

When enhancing the object, the visibility of the object is improved by applying image processing operations in the region in which the object of interest is located. These operations can be applied along the object boundary (e.g. edge sharpening), inside the object (e.g. texture enhancement), and possibly even outside the object (e.g. contrast increase, blurring outside the object area). For example, one way to draw more attention to an object is to sharpen the edges inside the object and along the object contour. This makes the details in the object more visible and also makes the object stand out from the background. Furthermore, sharper edges tend to survive encoding better. Another possibility is to enlarge the object, for instance by iteratively applying smoothing, sharpening and object refinement operations, not necessarily in that order.

Figure 3:
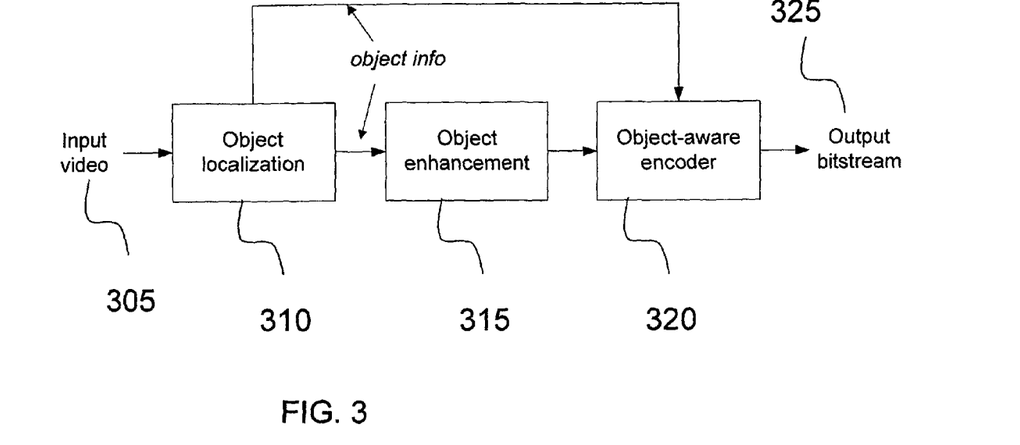
FIG. 3 is a flow chart of objecting highlighting according to the invention.

This object highlight system which is shown in a more simplied view in FIG. 3 detects important objects 310 in input video 305, performs object enhancement by appropriate pre-processing 315, and has the object-aware encoder 320 preserving objects. The object-aware encoder uses the object information from the object localization module in order to better preserve objects of interest during the encoding process.

The object information for a video frame is represented by an "encoder weights array" $W(x, y)$ which is a sequence of values, one for each pixel $(x, y)$ in the frame. More important objects have larger weights for their constituent pixels. The background pixel weights could be set to 0 by convention.

To better preserve objects, several methods may be used in an object-aware video encoder. These preservation methods can be naïve QP offset, weighted distortion measure and perceptual QP offset.

The Naïve QP offset method generally involves using the encoder weights array such that it is possible to determine which macroblocks (MBs) in a frame contain objects of interest. Depending on the object weights and the number of object pixels in the MB, it is possible to apply an appropriate offset to reduce the QP of the MB. This allocates more bits to these MBs resulting in better perceived quality.

Figure 4:
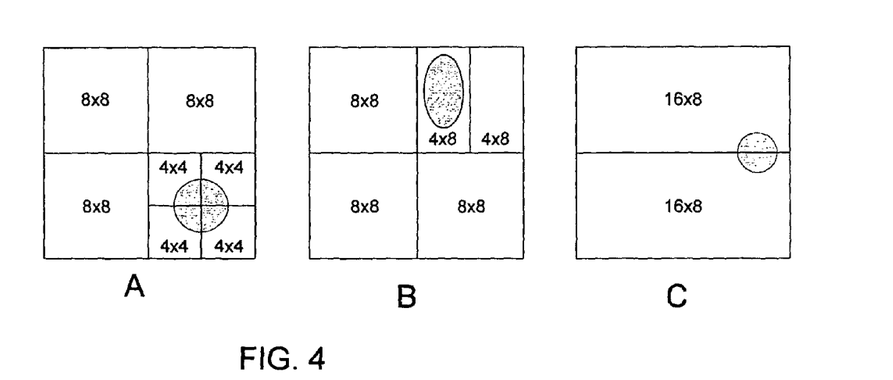
FIG. 4 shows examples of object-friendly macroblock (MB) partitioning in (a) and (b) and shows "unfriendly" MB partitioning in (c)

The weighted distortion measure involves having the encoder makes several mode decisions for each MB such as intra/inter/skip/direct coding and MB partitioning method (16×16, 8×8, 4×4, etc.) shown in FIG. 4. These decisions are based on a Rate-Distortion (R-D) tradeoff where rate corresponds to the number of bits allocated and distortion is a measure of coding fidelity. The distortion is normally computed as a sum of absolute differences (SAD) between the original and the encoded MB pixel values. In order to better preserve objects, the process uses a weighted SAD instead, wherein the differences at object pixels are weighted higher (i.e. multiplied by a value greater than 1) than non-object pixels. The object pixel weights are obtained from the encoder weights array. The weight of pixel (x, y) is given by W(x, y)+1. By emphasizing the distortion at object pixels, the weighted distortion measure results in better object preservation, since the R-D optimization tries to choose modes that minimize the overall MB distortion.

The perceptual QP offset method can be characterized as the perceptual frame-level QP offset approach. Perceptual QP offset is especially useful when the objects to be preserved span many MBs. Essentially, perceptual QP offset yields a better quality in the reference frame (I- and P-frame) and subsequently yields to better total coding efficiency. Perceptual QP offset is premised on the following relationship:

$$QP_I < QP_P < QP_B. \quad (1)$$

where $QP_I$, $QP_P$, and $QP_B$ denote QP of I-, P- and B-frame, respectively. The formulation of rate control with constant frame QP, the ultimate QP of a frame is the summation of the assumed constant QP (i.e., same for all frames) with that frame's particular QP offset. In this case, the preferred QP offset for each frame type is equivalently:

$$\Delta QP_I < \Delta QP_P < \Delta QP_B. \quad (2)$$

where $\Delta QP_I$, $\Delta QP_P$, and $\Delta QP_B$ denote QP offset of I-, P- and B-frame, respectively.

Another important factor for frame-level QP offset calculation is the temporal or motion masking effect of human visual systems (HVS). Basically, human eyes are less sensitive to quality degradations of high motion frames than to low motion frames. As such, smaller QPs should be applied to high motion frames than that for low motion frames, due to their higher temporal masking effect, while the same level of perceptual quality can still be perceived in the coded video.

The approach seeks to effectively calculate per-frame QP offset contribution from the amount of temporal masking effect at a frame, and then, properly combine that with the original QP offset contribution from frame type. The resultant frame-level QP offset accounts for both the frame type and temporal masking effect, and hence, is more comprehensive. The approach fine tuned for frame bit allocation (FBA) of a whole video clip or sequence in offline video coding. In spite of this, the approach is generally applicable to online real-time video coding as well, with various degrees of quality improvement depending on the involved look-ahead time. Extensive experiments have demonstrated that accounting for temporal masking effect into per-frame QP offset is more necessary and critical than the frame type factor to guarantee significant visual quality improvement from the global optimized FBA in offline video coding.

Most rate control schemes for either online or offline video coding only account for the frame type factor in FBA, but not any impact from HVS masking effect at all. Hence, in the offline coding case, even if their objective coding efficiency measured in average peak signal-to-noise ratio (PSNR) can be significantly improved over online coding via FBA of frame-type based per-frame QP offset, significant perceptual quality improvement still cannot be observed. It has been found that due to the global optimization of all frames' bit allocation of a sequence, high motion frames are allocated and coded with more bits than they are in the case of online coding. In the online coding case, bits are first allocated to each GOP (group of pictures), and in order to guarantee constant bit rate (CBR), the allocated bits of a GOP are proportional to the involved number of frames, i.e. GOP size, only, but not affected by their different coding complexity, e.g. high or low motions, etc. Therefore, in the offline coding case, given more bits, high motion frames are coded with higher PSNRs than they are in online coding. On the other hand, since the total amount of bits is the same, low motion frames are coded with lower PSNRs. The PSNR variations are indeed greatly reduced in this case. However, more constant PSNR does not mean more constant perceptual quality. Due to the HVS temporal masking effect, the high motion frame PSNR gains are much less perceivable than the low motion frame PSNR drops. Thus, the overall perceptual quality is, more often than not, worse than that of online coding. As such, the approach identifies that considering temporal masking effect in global FBA of a whole clip is necessary and critical for perceptual quality enhancement.

It is important to note that particular approaches that involve FBA accounting for temporal masking often have an underlying rate model that is either classification based or frame complexity based, which is not as accurate and general as the widely adopted R-QP modeling approach for rate control. Furthermore, widely adopted way of considering temporal masking is not via per-frame QP offset in FBA, and hence, cannot be applied for R-QP model based rate control solutions.

Accordingly, the perceptual frame-level QP offset approach is actually a proper combination of QP offset portion due to temporal masking, denoted by $\Delta QP_{Masking}$, and the portion due to frame type, denoted by $\Delta QP_{Type}$. This scheme is critical to render significant perceptual quality improvement of offline multi-pass coding over real-time single pass coding.

The temporal masking effect with frame complexity metric is defined as follows:

$$Cmpl = \overline{R}_{mv} + \overline{MAD}(Inter\_pred\_residue\_MBs) \quad (3)$$

$$Cmpl = \max(0.1, Compl-2) \quad (4)$$

where, Cmpl denotes the complexity of a frame. $\overline{R}_{mv}$ denotes the average MV coding bits per MB of the frame. $\overline{MAD}$ denotes the averaged mean-absolute-difference (MAD) of the prediction residue over all the MBs in a frame. Hence, their sum indeed represents the motion intensity of the current frame, which also equivalently signifies the coding complexity, and inter-frame change. The simple summation form in (3) is derived from good heuristics via extensive experiments.

In the encoder, $\overline{R}_{mv}$, $\overline{MAD}$, and hence, Cmpl are all computed based on original input frames before the encoding of a frame, and $\overline{MAD}$ only accounts for the Luma component. The calculation follows a simplified encoding process, including: only checking Inter 16×16 and Intra 16×16 mode, and only searching integer motion vectors.

Complexity of a frame, calculated from (3), is further constrained via (4). When the complexity is below 0.1, the prediction residue will be considered present due to inherent image noise, and hence, one can set the minimum complexity as 0.1, which also serves to prevent possible "dividing with zero" errors. Also, even without motion vector differences, the minimum average motion vector bits $\overline{R}_{mv}$ in (3) is still 2. Hence, this portion is always removed.

Note that herein the frame complexity is calculated for each frame via forward inter-frame prediction only, as the frame display or viewing order follows the forward direction. That is for any frame, no matter its frame type (i.e.. either I, P, or B-frames), one will just use the frame complexity calculated in (3) to measure its motion intensity, and hence, its motion masking effect.

As can be seen from equation (10) below, that the final QP offset is actually a proper combination of QP offset portion due to temporal masking, denoted by $\Delta QP_{Masking}$, and the portion due to frame type, denoted by $\Delta QP_{Type}$. This scheme is critical to render significant perceptual quality improvement of offline multi-pass coding over real-time single pass coding. The scheme involves the following calculations:

Calculate $\Delta QP_{Masking}$: for frame n:

$$Compl_{Masking}(n) = \frac{1}{2K+1} \sum_{i=n-K}^{n+K} Compl(i). \quad (5)$$

If frame n is a scene-change frame, instead of (5):

$$Compl_{Masking}(n) = \frac{1}{K+1}\left(\min(Compl_{max}, Compl(n)) + \sum_{i=n+1}^{n+K} Compl(i)\right) \quad (6)$$

$$\Delta QP_{Masking}(n) = a \cdot Compl_{Masking}(n) \quad (7)$$

$$\overline{\Delta QP_{Masking}} = \frac{1}{N}\sum_{i=1}^{N} \Delta QP_{Masking}(i) \quad (8)$$

$$\Delta QP_{Masking}(n) = \min(\Delta QP_{Masking,max}, \quad (9)$$
$$\max(\Delta QP_{Masking,min}, \Delta QP_{Masking}(n) - \overline{\Delta QP_{Masking}}))$$

Here, K=1.2K+1=3 is the window size. Complmax=40. a=0.5. N denotes total number of frames in the video clip. $\Delta QP_{Masking,max}=8$,

- $\Delta QP_{Masking,min} = -8$.
- Calculate $\Delta QP_{Type}$: for frame n:
- If I-frame:
  - If GOPSize = 1 → $\Delta QP_{Type}(n) = 0$.
  - Else if GOPSize ≤ 10
    {
    - If GOPAvgCompl < 6 → $\Delta QP_{Type}(n) = -6$.
    - Else if GOPAvgCompl < 14 → $\Delta QP_{Type}(n) = -4$.
    - Else → $\Delta QP_{Type}(n) = -2$.
    }
  - Else
    {
    - If GOPAvgCompl < 6 → $\Delta QP_{Type}(n) = -8$.
    - Else if GOPAvgCompl < 14 → $\Delta QP_{Type}(n) = -6$.
    - Else → $\Delta QP_{Type}(n) = -4$.
    }
- If P-frame:
  - If it is used for prediction of B-frames → $\Delta QP$-Type(n) = -2.
  - Else → $\Delta QP_{Type}(n) = 0$.
- If B-frame: → $\Delta QP_{Type}(n) = +4$.

Herein, GOPAvgCompl is the average frame complexity of the current GOP excluding the $1^{st}$ I-frame.

Calculate final $\Delta QP$: for frame n:

$$\Delta QP(n) = \min(\Delta QP_{max}, \max(\Delta QP_{min}, \Delta QP_{Masking}(n) + \Delta QP_{Type}(n))). \quad (10)$$

Herein, $\Delta QP_{max}=15$, $\Delta QP_{min}=-15$.

In (5), temporal masking complexity of a frame is calculated as the average frame complexity of the current frame's neighboring frames in a certain size of window (i.e. 2K+1). This is to apply some low-pass filtering to avoid high dynamic change of the temporal masking complexity of a frame due to possible high dynamic change of frame complexity.

For a scene-change frame, its frame complexity will be very high. Hence, its temporal masking complexity is specially calculated as in (6), where a maximum constraint is applied for its frame complexity, and the averaging only applies to its forward neighboring frames in the same scene.

Given the temporal masking frame complexity, the portion of QP offset from temporal masking effect is calculated via linear mapping as in (7). This is derived from good heuristics, which works effectively with the complexity metric. $\Delta QP_{Masking}(n)$ from (7) is then normalized with the average $\overline{\Delta QP_{Masking}}$, and bounded within a certain reasonable range, as shown in (9).

The $\Delta QP_{Type}$ calculation of the present invention embodies the heuristic rule as described in (2). Specifically, if a GOP has more frames, or if a GOP is of lower motion, more bits for the first I-frame in the GOP will be more preferred, as this will bring more coding efficiency benefit for the following frames in the GOP. Therefore, in these cases, a more negative QP offset will be desired, and vice versa.

The QP offset contributions from both the temporal masking effect and the frame type impact are then combined together via simple addition and bounding in (10). The resultant per-frame QP offset from (10) will then be used in an R-QP modeling based rate control solution to calculate allocated bits for every frame in a sequence, while assuming constant OP for constant quality in bit allocation.

A brief description of such a rate control solution for frame-level bit allocation is described as follows.

1. Search for the optimal QP, denoted as $QP_{Opt}$, s.t.

$$\min_{QP}\left|R_{Total} - \sum_{i=1}^{N} R_i(QP + \Delta QP_i)\right|. \quad (11)$$

2. Calculate allocated bit budget for each frame based on $QP_{Opt}$:

$$R_{i,alloc} = R_i(QP_{Opt} + \Delta QP_i). \quad (12)$$

Here, $R_{Total}$ denotes the total number of bits for the whole video sequence. N is the total number of frames in the video sequence. $R_i$ is the number of bits for frame i. $\Delta QP_i$ is the perceptual frame-level OP offset as calculated in (8). $R_{i, alloc}$ is the allocated number of bits for frame i.

Figure 5:
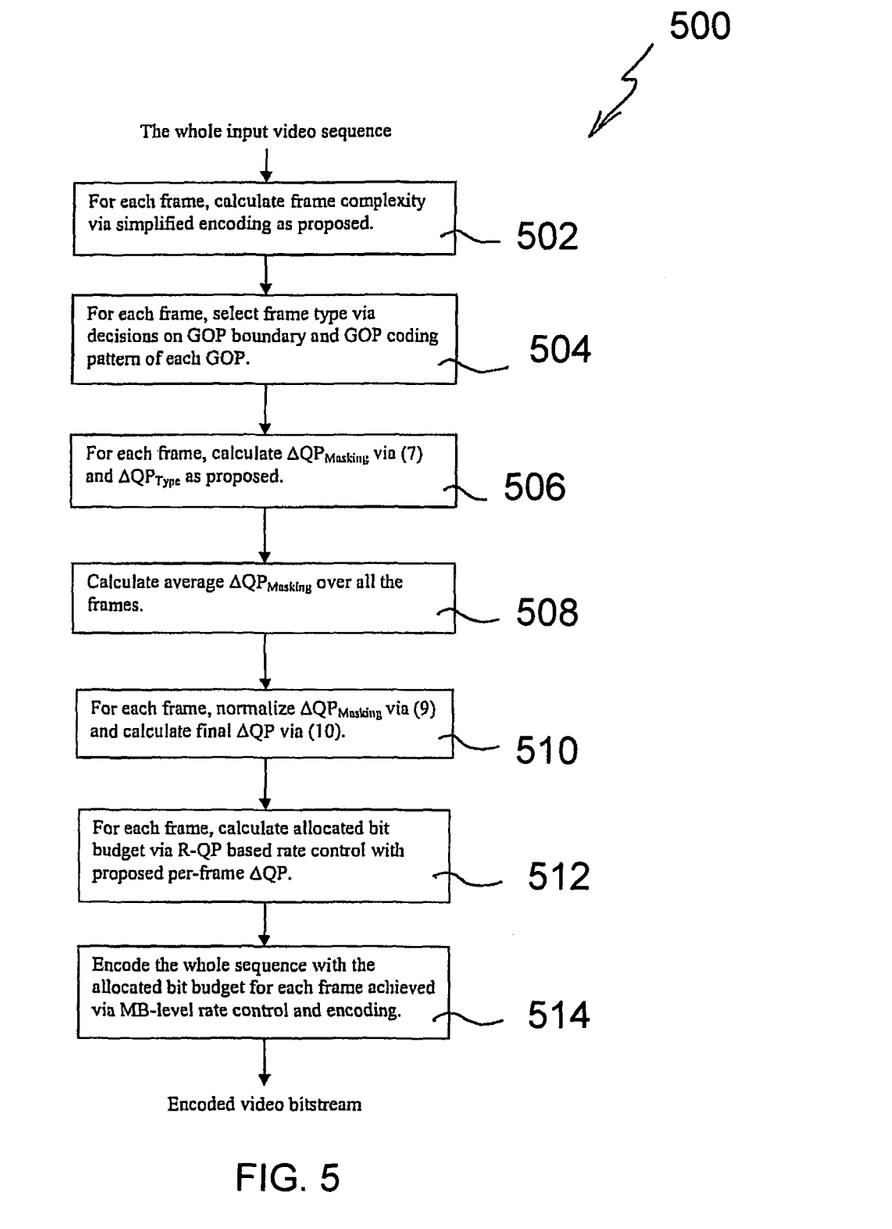
FIG. 5 is an exemplary flow diagram of the encoding process of a whole video segment using the perceptual frame-level QP offset in globally optimized R-QP model based frame-level bit allocation, used the invention.

An example of the process 500 of a whole video sequence using the perceptual frame-level QP offset in globally optimized R-QP model based frame-level bit allocation is illustrated in the flow diagram of FIG. 5. As shown, the whole input video sequence is received and for each frame, the frame complexity is calculated (502) using simplified encoding as described above (equations (3) and (4)). Then for each fame, the frame type is selected (504) using decisions on GOP boundary and GOP coding pattern of each GOP. Then, for each frame, the $\Delta QP_{Masking}$ is calculated (506) using equation (7) and the $\Delta QP_{Type}$ as discussed above. The Average $\overline{\Delta QP_{Masking}}$ is then calculated (508) over all the frames. For each frame, $\Delta QP_{Masking}$ is normalized using equation (9) and calculate (510) the final $\Delta QP$ using equation (10). Using the calculated final $\Delta QP$, one then calculates the allocated bit budget (512) for each frame using R-QP based rate control as described above with respect to equations (11) and (12). At this stage, the whole sequence is encoded (514) with the allocated bit budget for each frame achieved using the MB-level rate control and encoding.

Extensive experimental results show that: without considering the temporal masking effect, using $\Delta QP_{Type}$ only as frame QP offset, the globally optimized rate control with the whole sequence available as in equations (9) and (10) performs no better than the locally optimized rate control with only one current GOP available. However, with further considering the temporal masking effect as set forth in the embodiments of the invention, significant perceptual quality improvement can be achieved. Specifically, compared with GOP optimized rate control, the sequence optimized rate control with the proposed frame-level QP offset approach can achieve much better coding quality on: (i) low motion frames that are neighboring with high motion frames; and (ii) low motion short GOPs at the end of a scene, while a little worse quality on low motion GOPs. Overall, the visual experience of coded video is always better.

Figure 6:
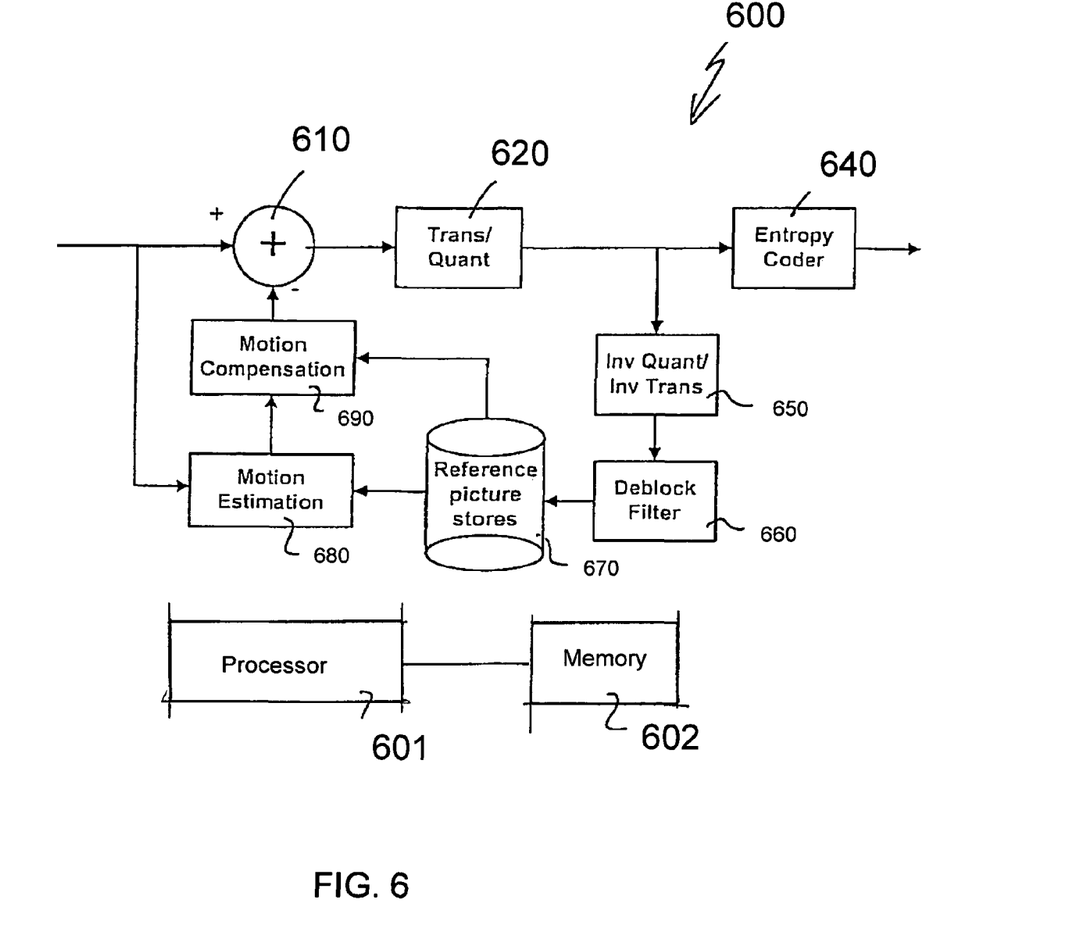
FIG. 6 is block diagram of an exemplary standard video encoder capable of implementing the bit allocation used in the invention.

FIG. 6 shows an block diagram of an exemplary video encoder 600 to which the present invention may be applied. Initially, the processor 601 and memory 602 are in signal communication with all elements of the encoder and operate to control the same. An input to the video encoder 600 is connected in signal communication with a non-inverting input of a summing junction 610. The output of the summing junction 610 is connected in signal communication with a transformer/quantizer 620. The output of the transformer/quantizer 620 is connected in signal communication with an entropy coder 640. An output of the entropy 640 is available as an output of the encoder 600.

The output of the transformed/quantizer 620 is further connected in signal communication with an inverse transformer/quantizer 650. An ouput of the inverse transformer/quantizer 450 is connected in signal communication with an input of a deblock filter 660. An output of the deblock filter 660 is connected in signal communication with reference pictures stores 670. A first output of the reference picture stores 670 is connected in signal communication with a first input of a motion estimator 680. The input to the encoder 600 is further connected in signal communication with a second input of the motion estimator 680. The output of the motion estimator 680 is connected in signal communication with a first input of a motion compensator 690. A second output of the reference pictures stores 670 is connected in signal communication with a second input of the motion compensator 690. The output of the motion compensator is connected in signal communication with an inverting input of the summing junction 610.

Regarding the naïve QP offset process, it changes the QP after a frame-level rate control method has determined the QP of the MB. Changing many MBs this way, however, could cause instability in the rate control process and reduce the overall perceived quality. It is been determined that it is better to specify the desired QP offset for each MB (based on its desired perceptual quality) prior to the frame-level rate control process. The rate control process then takes into account all the information in order to allocate resources accordingly to each MB.

Strategies to preserve objects of interest according to the invention could be determined by combinations of the above three processes (i.e. naïve quantization parameter (QP) offset, a weighted distortion metric, and perceptual quantization (QP) offset). The combination may depend on several criteria which can take into account the characteristics of the objects to be preserved and the scene.

One strategy involves considering the total area of the objects of interest in the frame. If the number of pixels with encoder weights exceeding 0 (i.e., W(x, y)>0) encompasses an area that is less than a predetermined threshold area ($T_{area}$), then the perceptual QP offset methodology should be employed.

A second strategy involves considering the total number of MBs containing object pixels or the number of object pixels. If the total number of MBs containing object pixels or the number of object pixels have an area less than a threshold ($T_{area}$), use the naïve QP offset methodology or the weighted distortion measure.

The two strategies are based on the expectation that the perceptual QP offset methodology is more robust when the number of MBs to be preserved is large. However, the naïve QP offset methodology and the weighted distortion measure methodology provides better results when only a few MBs are involved.

The criteria that determine the strategy is determined based on a number of objects and scene characteristics such as, areas of the objects of interest, importance of the objects, velocities of the objects, and history of object preservation (e.g. whether the corresponding MB in previous frames was given a higher QP).

In one application of the invention, face regions are detected in video-conferencing videos and used to control the quantization granularity of the background regions.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method comprising:
    selecting at least two frames from a video sequence having a plurality of frames;
    determining a total area of at least one object of interest in each of the selected frames;
    comparing each total area to a threshold area;
    classifying each selected frame having a total area exceeding the threshold area as a low object weighted frame;
        determining per-frame QP (quantization parameter) offset contribution from an amount of temporal masking effect at a frame ($\Delta QP_{Masking}$) for those high object weighted frames that are contiguous;
        combining the $\Delta QP_{Masking}$ with a QP offset contribution obtained from the frame type ($\Delta QP_{Type}$);
    classifying each of the selected frames having a total area not exceeding the threshold area as a high object weighted frame;
    encoding each low object weighted frame according to a first encoding mode and encoding each high object weighted frame according to a different encoding mode, wherein the high object weighted frames that are contiguous are encoded using a bit rate obtained using the combined calculated $\Delta QP_{Masking}$ with a QP offset contribution obtained from the frame type ($\Delta QP_{Type}$).

2. The method of claim 1 comprising:
    determining which macroblocks in a frame contain the at least one object of interest;
    determining an initial QP for each of the at least two frames;
    applying an offset to the initial QP for the low object weighted frames; and
    increasing bit allocation for the macroblocks contained in the at least one object of interest responsive to the applying.

3. The method of claim 1, further comprising:
    calculating frame complexity for the high object weighted frames that are contiguous;
    selecting frame type based on GOP boundary and GOP coding pattern for each GOP of high object weighted frames that are contiguous;

calculating the per frame QP-offset contribution based on frame type ($\Delta QP_{Type}$).

4. The method of claim 3, further comprising:
calculating an average $\Delta QP_{Masking}$ over all high object weighted frames;
normalizing $\Delta QP_{Masking}$; and
calculating a final per frame $\Delta QP$.

5. The method of claim 4, further comprising:
calculating an allocated bit budget and rate control using the calculated final per frame $\Delta QP$.

6. The method of claim 1, wherein said calculating per-frame QP offset contribution from an amount of temporal masking effect at a frame ($\Delta QP_{Masking}$) is performed using $\Delta QP_{Masking}(n) = a \cdot Compl_{Masking}(n)$, where $Compl_{Masking}(n)$ comprises a temporal masking complexity of a frame calculated as an average of a current frame's neighboring frames in a predetermined size of window for high object weighted frames, wherein $\Delta QP_{Masking}(n)$ represents the temporal masking of a current frame n and a is a constant of 0.5.

7. The method of claim 3, wherein the calculating frame complexity for each frame for high object weighted frames is performed using forward inter-frame prediction.

8. The method of claim 1 comprising:
determining which macroblocks in a frame contain the at least one object of interest; determining an initial QP for each of the at least two frames; and
applying an offset to the initial QP for the low object weighted frames, whereby bit allocation for the macroblocks contained in the at least one object of interest increases.

9. The method of claim 3 comprising
determining which macroblocks in a frame contain the at least one object of interest;
determining an initial QP for each of the at least two frames; and
applying an offset to the initial QP for the low object weighted frames, whereby bit allocation for the macroblocks contained in the at least one object of interest increases.

10. The method of claim 1 comprising
determining sum of absolute differences (SAD) between original and encoded macroblocks pixels for more than one coding mode for the low object weighted frames;
selecting a coding mode having lower sum of absolute difference than at least one other coding mode in the sum of absolute differences determination for the low object weighted frames;
coding the low object weighted frames according the respective coding modes selected in the selecting.

11. The method of claim 10 comprising
applying an encoder weight array in the sum of absolute differences determining such that pixels of the objects are assigned a greater weight than non-object pixels.

12. An encoder system for encoding video sequences, the encoder comprising:
a processor, a memory, and an encoder;
wherein the encoder system is configured:
to select at least two frames from a video sequence having a plurality of frames;
to determine a total area of at least one object of interest in each of the selected frames;
to compare each total area to a threshold area;
to classify each selected frame having a total area exceeding the threshold area as a low object weighted frame and to classify each of the selected frames having a total area not exceeding the threshold area as a high object weighted frame;
to determine per-frame QP (quantization parameter) offset contribution from an amount of temporal masking effect at a frame ($\Delta QP_{Masking}$) for those high object weighted frames that are contiguous;
to combine the $\Delta QP_{Masking}$ with a QP offset contribution obtained from the frame type ($\Delta QP_{Type}$); and
to encode each low object weighted frame according to a first encoding mode and encoding each high object weighted frame according to a different encoding mode, wherein the high object weighted frames that are contiguous are encoded using a bit rate obtained using the combined calculated $\Delta QP_{Masking}$ with a QP offset contribution obtained from the frame type ($\Delta QP_{Type}$).

13. The encoder system of claim 12 wherein the encoder system is configured:
to determine the number of pixels that constitute the objects of interest;
to employ a perceptual quantization parameter offset determination for frames having the area of the number of said pixels exceeding the threshold area; and
to code the frames in a coding mode that is responsive to the perceptual quantization parameter offset determination.

14. The encoder system of claim 13 wherein the encoder system is configured:
to employ a naïve QP offset determination, wherein an initial QP for each of at least two frames is determined and the area of the number of said pixels does not exceed the threshold;
to apply an offset to the initial QP for the at least two frames;
to increase bit allocation for macroblocks contained in the at least one object of interest responsive to the offset; and
to code the least two frames having the area of the number of said pixels not exceeding the threshold in a coding mode that is responsive to the offset.

15. The encoder system of claim 12 wherein the encoder system is configured:
to determine the number of pixels that constitute the objects of interest;
to employ a naïve QP offset determination, wherein an initial QP for each of at least two frames is determined and the area of the number of said pixels does not exceed the threshold;
to apply an offset to the initial QP for the at least two frames;
to increase bit allocation for macroblocks contained in the at least one object of interest responsive to the offset; and
to code the least two frames having the area of the number of said pixels not exceeding the threshold in a coding mode that is responsive to the offset.

* * * * *